B. R. NEWCOMB.
JACKETED CYLINDER CONSTRUCTION.
APPLICATION FILED JULY 20, 1920.
1,368,522.
Patented Feb. 15, 1921.
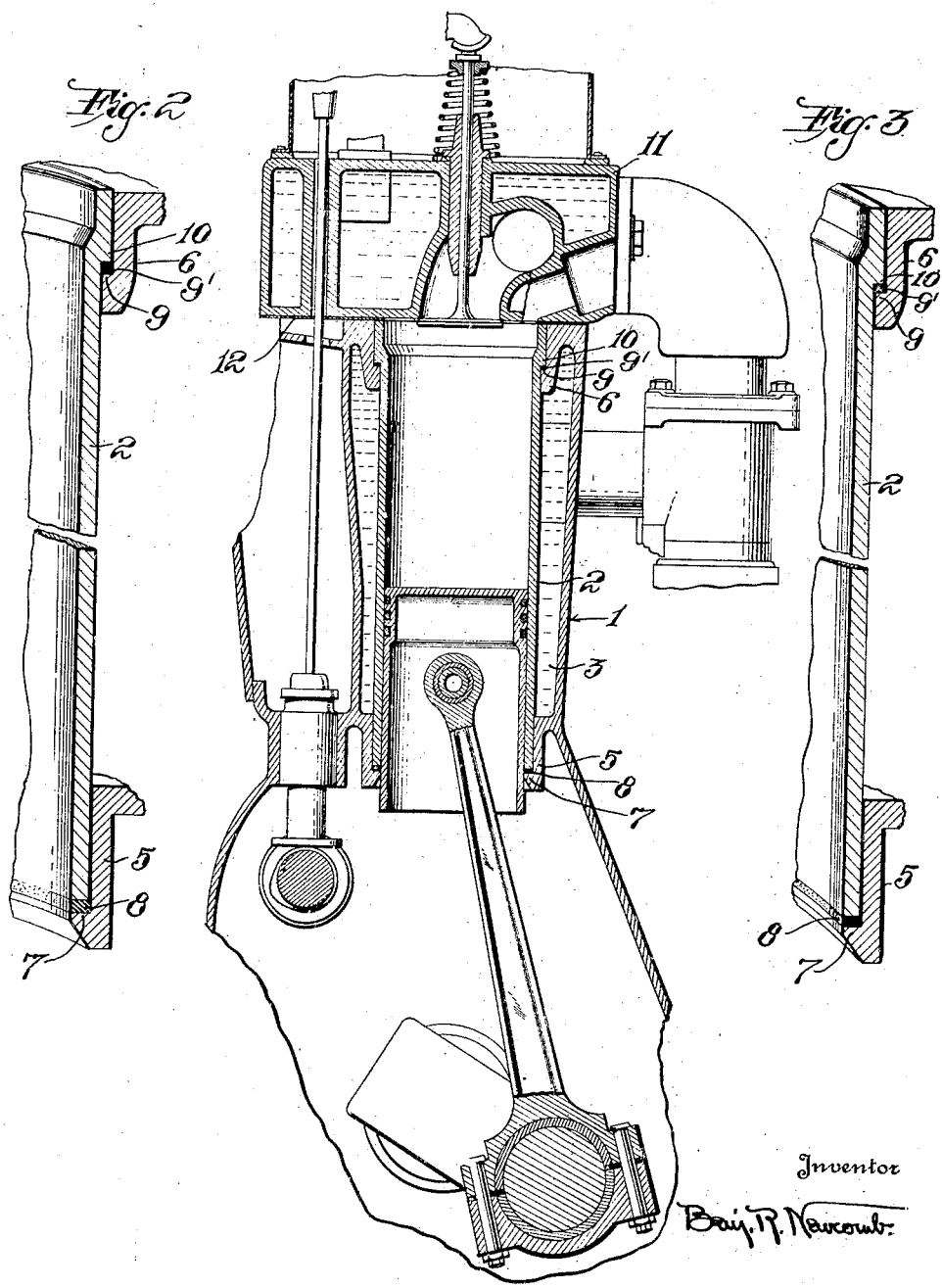

UNITED STATES PATENT OFFICE.

BENJAMIN R. NEWCOMB, OF HOLYOKE, MASSACHUSETTS.

JACKETED-CYLINDER CONSTRUCTION.

1,368,522.

Specification of Letters Patent.  Patented Feb. 15, 1921.

Application filed July 20, 1920.  Serial No. 397,673.

*To all whom it may concern:*

Be it known that I, BENJAMIN R. NEWCOMB, a citizen of the United States, residing at Holyoke, in the county of Hampden, State of Massachusetts, have invented certain new and useful Improvements in Jacketed-Cylinder Construction, of which the following is a specification.

This invention relates to cylinder construction of the jacketed type such as is most commonly used in connection with internal combustion motors.

Recent developments have produced a jacketed cylinder in which a motor body or shell receives an insertible and removable cylinder sleeve, making a particularly desirable construction in that it permits of the use of metals of different coefficients of expansion for the body or shell and the sleeve.

However, some difficulty has been experienced in properly seating the sleeve in the body with a tight joint and yet compensating for the expansion of the two parts relative to each other while, at the same time, maintaining a fluid tight joint at all places where the sleeve seats on the body or shell. A particularly good joint is required inasmuch as the sleeve, besides forming the cylinder proper, forms one of the jacket walls.

In one type of patented construction an effort to overcome the difficulty above mentioned has resulted in the provision of complemental shoulders on the body or shell and the sleeve, such shoulders being so arranged that a joint between the body or shell and sleeve is obtained approximate each end of the sleeve, one of these joints being a metallic fit of rigid form and the other an expansion compensating joint formed by placing a compressible gasket between the complemental shoulders of the body or shell and sleeve. Very good results have been obtained with this construction but it is difficult to produce a metallic contact sufficiently perfect for a fluid tight joint. Originally the joint must be ground to a perfect fit and each time it is disturbed it must be reground, thus making an expensive construction to assemble as far as labor cost is concerned and, at best, such a joint is relatively unsatisfactory due to the difficulty encountered in producing a non-leakable joint.

In the present invention the disadvantageous features of the construction just previously described are overcome by using a motor block or shell and an insertible and removable cylinder sleeve with complemental shoulders forming a joint approximate each end of the sleeve, but instead of a metal fit at one end of the sleeve and an expansion compensating joint at the other compressible gaskets are used in each joint but these gaskets are so proportioned relative to each other that one gasket reaches its limit of compressibility before the other, whereby the sleeve comes to a firm seat on the one gasket while the other still remains in a condition to compensate for expansion and contraction of the parts.

In the drawings:

Figure 1 is a vertical section of an internal combustion engine embodying the present invention.

Fig. 2 is a fragmentary perspective showing the relation of the body or shell, sleeve and gaskets previous to final seating of the sleeve.

Fig. 3 is a view similar to Fig. 2 showing the relative position of the body and sleeve and the condition of the gaskets after final seating of the sleeve.

Referring to the drawings:

The motor body or shell of the cylinder block is indicated at 1 and is preferably of aluminum or an aluminum alloy, or any other suitable metal. The body or shell 1 is hollow throughout its length and may be constructed for any desired number of cylinders.

Mounted within the body or shell 1 are cylindrical sleeves 2 constituting the explosion cylinders. These sleeves may be made of cast iron or other metal suitable to the requirements and which may have a different coefficient of expansion than the aluminum or other metal of which the body or shell 1 is constituted. The cylinder sleeves, in the case of a multi-cylinder engine, are separated from each other by a wall space 3 extending continuously from end to end of said body or shell 1 and entirely around the sleeves and forms part of the cooling system, and is adapted to be filled with a cooling medium. In each cylinder is a piston 4.

Each cylinder sleeve fits within an annular vertical bore section or flange 5 projected inwardly from the lower end of the engine body, and within a similar bore section 6 at the upper end thereof. The lower section is provided with a lateral shoulder 7, the face of which lies in a plane at right angles to the cylinder axis on which is mounted a packing gasket 8 composed of a suitable resilient material such as granulated cork. The lower face of the sleeve 2 bears against this packing and serves to compress the same so as to form a tight joint therewith.

The sleeve 2 is held in the annular bore 5 with a slip fit, enabling the sleeve to be readily inserted and removed without heating the parts or forcing the sleeve into the bore, and permitting of slight relative expansion without undue binding of the sleeve and wall of the engine body. There may be clearance between these parts, the necessary tight closure of the joint between the sleeve and body wall at the lower end being obtained solely by means of the resilient gasket 8.

The upper bore section 6 is provided with a similar supporting shoulder 9 which carries a compressible gasket 9', against which is adapted to seat firmly the lower face of a complementary shoulder 10 formed on the sleeve 2. The portion of the sleeve 2 above the shoulder has a slip fit with the upper part of the bore section, and may have a clearance similar to that at the lower end which permits expansion of the bore section without undue pressure against the sleeve. The slip fit clearance between the sleeve and the bore section below the shoulder 9 may be slightly greater than the other clearance to prevent any binding that may tend to result from clamping the head of the motor to the body.

Above the cylinders and bearing down tightly against the upper face of the motor body and the sleeves is a removable head 11, in which the valves and spark plugs are mounted. Between the head and the body and sleeves is a flexible packing member 12.

The vertical length of the sleeve 2 between the shoulder 7 and the shoulder 9 is so proportioned to the length of the body between the horizontal surfaces of said shoulders and the thickness of the gaskets 8 and 9' and the compressibility of the said gaskets and the packing member 12, that when the sleeves are inserted and clamped down by the pressure of the head until the upper ends of the sleeves are flush with the top face of the body, the gaskets 9' will have been substantially completely compressed thereby affording a firm seat for each sleeve, while the gaskets 8 will be but partially compressed and the gasket or packing member 12 will still have not quite reached its limit of compressibility.

Therefore, when expansion takes place, the pressure will be exerted against surfaces lying only in planes at right angles to the axis of the cylinder sleeves and will be taken care of primarily by the gaskets 8, and secondarily by the packing member 12, while the seat of the sleeves in the body remains firm regardless of the fact that it is a gasket joint which serves as the seat for each sleeve. The pressure developed by the expansion of the sleeves longitudinally of their axis does not impose any side stress against the sleeves such as would tend to distort the same and by reason of the firm seating of each sleeve on its gasket 9' no cocking of the sleeve is possible. The gaskets 9' compressed in assembling limit the assembled compression of the packing 8 so that said packing, after complete compression of the gaskets 9', possesses a range of resiliency sufficient to yield or expand to always forms a fluid-tight joint between the body and sleeves at the lower end.

I claim:

1. A jacketed cylinder comprising a body and an insertible and removable sleeve, the body and sleeve having sets of complemental joint-closing faces, and compressible means between the joint-closing faces of each set, said means for each set having relatively different degrees of compressibility whereby said sleeve reaches a firm seat on one of said means while another remains but partially compressed to enable it to compensate for expansion and contraction of the body and sleeve.

2. A jacketed cylinder comprising a body and an insertible and removable sleeve, the body and sleeve having complemental joint closing faces in planes at right angles to the axis of the cylinder, and compressible gaskets between said joint closing faces, said gaskets having different degrees of compressibility whereby the said sleeve reaches a firm seat on a substantially completely compressed gasket while another remains only partially compressed thereby compensating for relative expansion and contraction of the body and sleeve, and means for holding the sleeve.

3. A jacketed cylinder comprising a body and an insertible and removable sleeve, the body and sleeve having complemental joint closing faces in planes at right angles to the axis of the cylinder approximate each end of the sleeve, a compressible gasket between each pair of joint closing faces, one of said gaskets being resilient and having a greater degree of compressibility than the other whereby the said sleeve reaches a firm seat prior to complete compression of the resilient gasket permitting the latter to remain in condition to compensate for relative expansion and contraction of the body and sleeve, and means holding the sleeve.

4. An internal combustion engine comprising a body and an insertible and removable cylinder sleeve, said body and sleeve each having two joint-closing faces only adjacent the outer and inner ends of the cylinder sleeve, a gasket between the outer faces, the outer end surfaces of the cylinder sleeve being flush with the adjoining surfaces of the body when the sleeve is finally seated, and a resilient gasket of greater compressibility than the first mentioned gasket and interposed between the inner faces of the body and sleeve, the vertical length of said sleeve between its joint closing faces being less than the vertical distance between the corresponding faces of the body and proportioned to the limit of compressibility of the first mentioned gasket whereby the sleeve is firmly seated on the compressed outer gasket when the inner end of the cylinder sleeve has compressed the inner gasket below the limit of compressibility thereof.

5. An internal combustion engine comprising a body and an insertible and removable cylinder sleeve, said body and sleeve each having two joint closing faces only, such faces lying in planes at right angles to the axis of the cylinder and adjacent the outer and inner ends of the cylinder sleeve, a gasket between the outer faces, the outer end surfaces of the cylinder sleeve being flush with the adjoining surface of the body when the sleeve is finally seated, and a resilient gasket of greater compressibility than the first mentioned gasket and interposed between the inner faces of the body and sleeve, the vertical length of said sleeve between its joint closing faces being less than the vertical distance between the corresponding faces of the body and proportioned to the limit of compressibility of the first mentioned gasket whereby the sleeve is firmly seated on the compressed outer gasket when the inner end of the cylinder sleeve has compressed the inner gasket below the limit of compressibility thereof.

6. An internal combustion engine having a body and a separate cylinder sleeve, said body composed of a metal having a different co-efficient of expansion than the sleeve material, said parts having clearance between the body and sleeve in planes concentric with the axis of the cylinder, said sleeve and body having complementary lateral shoulders near the outer ends, a gasket completely compressed between said shoulders to form a firm seat only when the outer end of the inserted sleeve is flush with the adjacent surface of the body, said body having a lateral shoulder at the inner part thereof opposing a complemental portion of the sleeve, a resilient packing interposed between said shoulder and complemental portion, the length of the sleeve between said complemental portion and its outer shoulder being proportioned to the distance between the shoulders of the body in such manner that complete compression of the gasket occurs while the packing is only partially compressed.

7. In an internal combustion engine the combination of a body and a separate cylinder sleeve having adjoining vertical faces with a clearance between said vertical faces of the body and sleeve and complementary horizontal shoulders adjacent the upper ends of said body and sleeve having a completely compressed resilient gasket therebetween when the sleeve is in position, said body being formed with a bore adapted to receive the lower end of the sleeve and formed with a shoulder, and a resilient gasket disposed between the end of the sleeve and said shoulder, the shoulder being so positioned that the gasket is partially compressed when the parts are in normal assembled position.

In testimony whereof I have hereunto set my hand in the presence of two subscribing witnesses.

BENJAMIN R. NEWCOMB.

Witnesses:
  EWD. L. TOLSON,
  RUBY GOOD.